(12) United States Patent
Barbouteau et al.

(10) Patent No.: US 11,161,962 B2
(45) Date of Patent: *Nov. 2, 2021

(54) RUBBER COMPOSITION COMPRISING A SPECIFIC REINFORCING FILLER

(71) Applicant: COMPAGNIE GENERALE DES ETABLISSEMENTS MICHELIN, Clermont-Ferrand (FR)

(72) Inventors: Joël Barbouteau, Clermont-Ferrand (FR); Auriane Frisch, Clermont-Ferrand (FR); Kazuhide Mima, Clermont-Ferrand (FR); Natsuko Shiozawa, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 199 days.

This patent is subject to a terminal disclaimer.

(21) Appl. No.: 16/346,357

(22) PCT Filed: Oct. 30, 2017

(86) PCT No.: PCT/FR2017/052985
§ 371 (c)(1),
(2) Date: Apr. 30, 2019

(87) PCT Pub. No.: WO2018/078307
PCT Pub. Date: May 3, 2018

(65) Prior Publication Data
US 2020/0181356 A1    Jun. 11, 2020

(30) Foreign Application Priority Data

Oct. 31, 2016 (FR) ..................... 1660555

(51) Int. Cl.
| | |
|---|---|
| *C08K 3/04* | (2006.01) |
| *B60C 1/00* | (2006.01) |
| *B60C 9/22* | (2006.01) |
| *C08K 3/08* | (2006.01) |
| *C08K 3/22* | (2006.01) |
| *C08K 3/36* | (2006.01) |
| *C08K 5/09* | (2006.01) |

(52) U.S. Cl.
CPC ............ *C08K 3/04* (2013.01); *B60C 1/00* (2013.01); *B60C 9/22* (2013.01); *C08K 3/08* (2013.01); *C08K 3/22* (2013.01); *C08K 3/36* (2013.01); *C08K 5/09* (2013.01); *B60C 2009/2214* (2013.01); *B60C 2009/2247* (2013.01); *B60C 2009/2257* (2013.01); *C08K 2003/0843* (2013.01); *C08K 2003/2296* (2013.01); *C08K 2201/006* (2013.01)

(58) Field of Classification Search
CPC ... C08K 3/04; C08K 3/08; C08K 3/22; C08K 3/36; C08K 5/09; B60C 1/00; B60C 9/22
See application file for complete search history.

(56) References Cited

U.S. PATENT DOCUMENTS

| | | | |
|---|---|---|---|
| 5,871,597 | A | 2/1999 | Vasseur |
| 5,977,238 | A | 11/1999 | Labauze |
| 6,013,718 | A | 1/2000 | Cabioch et al. |
| 6,169,137 | B1 | 1/2001 | Vasseur |
| 6,503,973 | B2 | 1/2003 | Robert et al. |
| 6,610,261 | B1 | 8/2003 | Custodero et al. |
| 6,747,087 | B2 | 6/2004 | Custodero et al. |
| 6,774,255 | B1 | 8/2004 | Tardivat et al. |
| 6,815,473 | B2 | 11/2004 | Robert et al. |
| 6,835,769 | B2 | 12/2004 | Custodero et al. |
| 6,849,754 | B2 | 2/2005 | Deschler et al. |
| 7,217,751 | B2 | 5/2007 | Durel et al. |
| 7,250,463 | B2 | 7/2007 | Durel et al. |
| 7,312,264 | B2 | 12/2007 | Gandon-Pain |
| 7,488,468 | B1 | 2/2009 | Tardivat et al. |
| 7,799,862 | B2 | 9/2010 | Chauvin |
| 7,825,183 | B2 | 11/2010 | Robert et al. |
| 7,834,074 | B2 | 11/2010 | Brunelet et al. |
| 7,882,874 | B2 | 2/2011 | Robert et al. |
| 7,893,147 | B2 | 2/2011 | Otsuki |
| 8,344,063 | B2 | 1/2013 | Marechal et al. |
| 8,455,584 | B2 | 6/2013 | Robert et al. |
| 8,492,475 | B2 | 7/2013 | Silva et al. |
| 8,492,479 | B2 | 7/2013 | Robert et al. |

(Continued)

FOREIGN PATENT DOCUMENTS

| | | |
|---|---|---|
| CN | 1463280 A | 12/2003 |
| CN | 102260381 A | 11/2011 |

(Continued)

OTHER PUBLICATIONS

U.S. Appl. No. 16/346,386, filed (Year: 2017).*

(Continued)

*Primary Examiner* — Edward J Cain
(74) *Attorney, Agent, or Firm* — Venable LLP

(57) ABSTRACT

A rubber composition has an improved rolling resistance and is based on at least a diene elastomer comprising mainly at least one isoprene elastomer; a reinforcing filler comprising from 15 to 70 phr of carbon black having a BET specific surface area of less than 70 $m^2/g$, and/or a COAN of less than 90 ml/100 g, and from 5 to 20 phr of silica; a salt of an alkaline-earth, alkali or lanthanide metal; and a crosslinking system; in which composition the carbon black to silica ratio is greater than 1.

33 Claims, 1 Drawing Sheet

(56) References Cited

U.S. PATENT DOCUMENTS

| | | |
|---|---|---|
| 8,507,397 B2 | 8/2013 | Cortial et al. |
| 8,865,803 B2 | 10/2014 | Miyazaki |
| 8,957,155 B2 | 2/2015 | Seeboth et al. |
| 9,010,393 B2 | 4/2015 | Silva et al. |
| 9,023,928 B2 | 5/2015 | Miyazaki et al. |
| 9,273,197 B2 | 3/2016 | Miyazaki |
| 9,650,492 B2 | 5/2017 | Makiuchi et al. |
| 9,902,204 B2 | 2/2018 | Lardjane et al. |
| 9,919,563 B2 | 3/2018 | Lardjane et al. |
| 2001/0036991 A1 | 11/2001 | Robert et al. |
| 2001/0039308 A1 | 11/2001 | Custodero et al. |
| 2002/0183436 A1 | 12/2002 | Robert et al. |
| 2004/0051210 A1 | 3/2004 | Tardivat et al. |
| 2004/0092647 A1 | 5/2004 | Chauvin |
| 2004/0132880 A1 | 7/2004 | Durel et al. |
| 2005/0004297 A1 | 1/2005 | Durel et al. |
| 2006/0089445 A1 | 4/2006 | Gandon-Pain |
| 2006/0217481 A1 | 9/2006 | Otsuki |
| 2007/0084537 A1 | 4/2007 | Hotaka |
| 2008/0009564 A1 | 1/2008 | Robert et al. |
| 2008/0026244 A1 | 1/2008 | Barbotin et al. |
| 2008/0156404 A1 | 7/2008 | Brunelet et al. |
| 2008/0319125 A1 | 12/2008 | Boswell et al. |
| 2009/0186961 A1 | 7/2009 | Silva et al. |
| 2009/0209709 A1 | 8/2009 | Silva et al. |
| 2009/0234066 A1 | 9/2009 | Silva et al. |
| 2010/0145089 A1 | 6/2010 | Mignani et al. |
| 2010/0168306 A1 | 7/2010 | Barbotin et al. |
| 2010/0184912 A1 | 7/2010 | Marechal et al. |
| 2010/0204359 A1 | 8/2010 | Robert et al. |
| 2010/0216935 A1 | 8/2010 | Boswell et al. |
| 2010/0249270 A1 | 9/2010 | Robert et al. |
| 2010/0252156 A1 | 10/2010 | Robert et al. |
| 2011/0094649 A1 | 4/2011 | Miyazaki |
| 2011/0152458 A1 | 6/2011 | Silva et al. |
| 2011/0294949 A1 | 12/2011 | Sakaki et al. |
| 2011/0294953 A1 | 12/2011 | Seeboth et al. |
| 2011/0319646 A1 | 12/2011 | Boswell et al. |
| 2012/0135857 A1 | 5/2012 | Cortial et al. |
| 2012/0157585 A1 | 6/2012 | Makiuchi et al. |
| 2012/0184634 A1 | 7/2012 | Chen et al. |
| 2012/0285601 A1 | 11/2012 | Miyazaki |
| 2014/0090764 A1 | 4/2014 | Miyazaki |
| 2014/0102611 A1* | 4/2014 | Miyazaki ............ C08K 5/47 152/450 |
| 2014/0124113 A1 | 5/2014 | Miyazaki et al. |
| 2015/0007922 A1 | 1/2015 | Lardjane et al. |
| 2015/0013873 A1 | 1/2015 | Lardjane et al. |
| 2015/0087744 A1 | 3/2015 | Yong et al. |
| 2018/0057665 A1 | 3/2018 | Miyazaki |
| 2018/0258262 A1 | 9/2018 | Oshimo et al. |
| 2019/0255884 A1 | 8/2019 | Barbouteau et al. |

FOREIGN PATENT DOCUMENTS

| | | |
|---|---|---|
| CN | 102428131 A | 4/2012 |
| CN | 102448970 A | 5/2012 |
| CN | 103764745 A | 4/2014 |
| EP | 1127909 A1 | 8/2001 |
| EP | 1707402 A1 | 10/2006 |
| EP | 2484720 A1 | 8/2012 |
| EP | 2730609 A1 | 5/2014 |
| EP | 3 293 224 A1 | 3/2018 |
| EP | 3 336 139 A1 | 6/2018 |
| FR | 2729671 A1 | 7/1996 |
| FR | 2740778 A1 | 5/1997 |
| FR | 2765882 A1 | 1/1999 |
| FR | 2869618 A1 | 11/2005 |
| JP | 2005-231458 A | 9/2005 |
| WO | 97/36724 A2 | 10/1997 |
| WO | 99/09036 A1 | 2/1999 |
| WO | 99/16600 A1 | 4/1999 |
| WO | 00/73373 A1 | 12/2000 |
| WO | 01/92402 A1 | 12/2001 |
| WO | 02/30939 A1 | 4/2002 |
| WO | 02/31041 A1 | 4/2002 |
| WO | 02/083782 A1 | 10/2002 |
| WO | 03/016387 A1 | 2/2003 |
| WO | 2004/096865 A1 | 11/2004 |
| WO | 2005/087859 A1 | 9/2005 |
| WO | 2006/023815 A1 | 3/2006 |
| WO | 2006/061064 A1 | 6/2006 |
| WO | 2006/125532 A1 | 11/2006 |
| WO | 2006/125533 A1 | 11/2006 |
| WO | 2006/125534 A1 | 11/2006 |
| WO | 2007061550 A1 | 5/2007 |
| WO | 2007/062669 A1 | 6/2007 |
| WO | 2007/098080 A2 | 8/2007 |
| WO | 2008/055986 A2 | 5/2008 |
| WO | 2008/141702 A1 | 11/2008 |
| WO | 2009/000750 A1 | 12/2008 |
| WO | 2009/000752 A1 | 12/2008 |
| WO | 2010/072685 A1 | 7/2010 |
| WO | 2010/133492 A1 | 11/2010 |
| WO | 2013/008798 A1 | 1/2013 |
| WO | 2013/117476 A1 | 8/2013 |
| WO | 2013/117477 A1 | 8/2013 |
| WO | 2013/141693 A1 | 9/2013 |

OTHER PUBLICATIONS

U.S. Appl. No. 16/346,298, filed (Year: 2017).*
U.S. Appl. No. 16/759,906, filed (Year: 2018).*
International Search Report dated Jan. 19, 2018, in corresponding PCT/FR2017/052985 (4 pages).
Search Report dated Apr. 4, 2017, in corresponding application FR 1660555 (6 pages).
S. Brunauer et al., "Adsoprtion of Gases in Multimolecular Layers", J. Am. Chem. Soc., vol. 60, pp. 309-319 (1938).
Co-pending U.S. Appl. No. 16/346,298, filed Oct. 30, 2017 (available on USPTO system).

* cited by examiner

RUBBER COMPOSITION COMPRISING A SPECIFIC REINFORCING FILLER

BACKGROUND

The present invention relates to rubber compositions intended in particular for the manufacture of tyres or of semi-finished products for tyres.

Since savings in fuel and the need to protect the environment have become a priority, it is desirable to process rubber compositions which can be used in the manufacture of various semi-finished products involved in the formation of tyre casings, such as, for example, underlayers, cabled fabric ply calendering rubbers, or treads, in order to obtain tyres having a reduced rolling resistance.

For this purpose, manufacturers have developed tyre compositions which make it possible to reduce this rolling resistance, especially by the introduction of silica as reinforcing filler, or of resin with a high glass transition temperature as plasticizer.

For example, document FR 2 729 671 proposes using a silica having a low CTAB and BET specific surface area as reinforcing filler in the tyre crown reinforcement composition. Moreover, the Applicant has already described the use of high-Tg resins, as described in document WO-2005/087859 or WO-2006/061064.

Nevertheless, manufacturers are always seeking solutions for further reducing the rolling resistance, preferably without penalizing the other properties of tyres, in particular the grip properties.

SUMMARY

Pursuing their research, the Applicant has discovered that the use of a specific reinforcing filler makes it possible to further improve the rolling resistance of a tyre, without penalizing, or even while improving, the other properties of the composition, such as the rigidity, the adhesion of the composition to metal reinforcers optionally present, or the wear resistance, and without penalizing the industrial processing of the compositions (processability).

Consequently, a first subject of the invention relates to a rubber composition based on at least:
  a diene elastomer comprising mainly an isoprene elastomer;
  a reinforcing filler comprising:
    from 15 to 70 phr of carbon black having a BET specific surface area of less than 70 m²/g and/or a COAN of less than 90 ml/100 g, and
    from 5 to 20 phr of silica;
  a salt of an alkaline-earth, alkali; or lanthanide metal; and
  a crosslinking system;
  in which the ratio of carbon black to silica is greater than 1.

Another subject of the invention is finished or semi-finished rubber articles for tyres and tyres comprising a rubber composition in accordance with the invention.

DETAILED DESCRIPTION

Definitions

Figure 1:
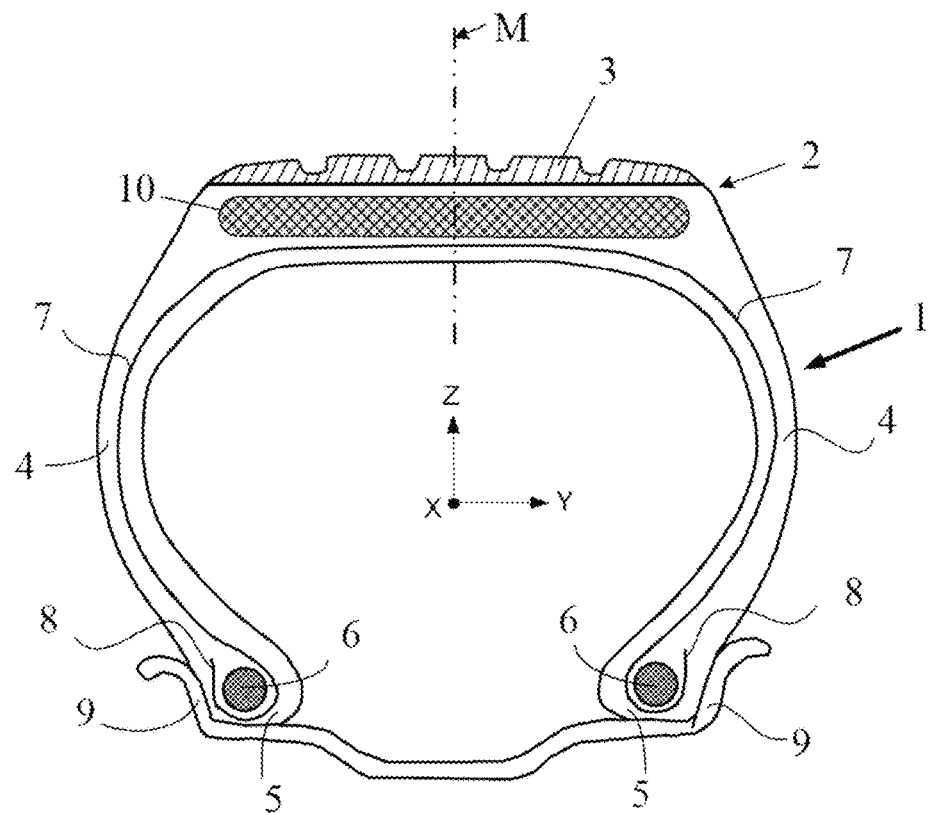
FIG. 1 schematically shows a radial section through a tire according to the invention.

The expression "part by weight per hundred parts by weight of elastomer" (or phr) should be understood as meaning, within the meaning of the present invention, the part by weight per hundred parts by weight of elastomer or rubber.

In the present document, unless expressly indicated otherwise, all the percentages (%) shown are percentages (%) by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b). In the present document, when an interval of values is denoted by the expression "from a to b", the interval represented by the expression "between a and b" is also and preferentially denoted.

In the present document, the expression composition "based on" is understood to mean a composition comprising the mixture and/or the reaction product of the various constituents used, some of these base constituents being capable of reacting or intended to react with one another, at least in part, during the various phases of manufacture of the composition, in particular during the crosslinking or vulcanization thereof. By way of example, a composition based on an elastomeric matrix and on sulfur comprises the elastomeric matrix and the sulfur before curing, whereas, after curing, the sulfur is no longer detectable as the latter has reacted with the elastomeric matrix with the formation of sulfur (polysulfide, disulfide, monosulfide) bridges.

When reference is made to a "predominant" compound, this is understood to mean, within the meaning of the present invention, that this compound is predominant among the compounds of the same type in the composition, that is to say that it is the one which represents the greatest amount by weight among the compounds of the same type, for example more than 50%, 60%, 70%, 80%, 90%, indeed even 100%, by weight relative to the total weight of the compound type. Thus, for example, a predominant reinforcing filler is the reinforcing filler representing the greatest weight relative to the total weight of the reinforcing fillers in the composition. On the contrary, a "minor" compound is a compound which does not represent the greatest fraction by weight among the compounds of the same type.

Within the context of the invention, the carbon products mentioned in the description may be of fossil or biobased origin. In the latter case, they may partially or completely result from biomass or be obtained from renewable starting materials resulting from biomass. Polymers, plasticizers, fillers, and the like, are in particular concerned.

Elastomeric Matrix

The composition according to the invention comprises at least a diene elastomer comprising mainly at least one isoprene elastomer. Thus, the composition according to the invention can contain just one isoprene elastomer or a mixture of an isoprene elastomer with one or more other diene elastomers, the composition consisting mainly of isoprene elastomer.

It is recalled here that elastomer (or "rubber", the two terms being regarded as synonymous) of the "diene" type should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

These diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of alpha-olefins of EPDM type do not come within the preceding definition and can in particular be described as "essentially saturated" diene elastomers (low or very low content, always less than 15%, of units of diene origin). In the category of "essentially unsaturated" diene elastomers, a "highly unsaturated" diene elastomer is understood in particular to mean a diene elastomer having a content of units of diene origin (conjugated dienes) which is greater than 50%.

Given these definitions, diene elastomer capable of being used in the compositions in accordance with the invention is understood more particularly to mean:
(a) any homopolymer obtained by polymerization of a conjugated diene monomer having from 4 to 12 carbon atoms;
(b) any copolymer obtained by copolymerization of one or more conjugated dienes with one another or with one or more vinylaromatic compounds having from 8 to 20 carbon atoms;
(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;
(d) a copolymer of isobutene and of isoprene (butyl rubber) and also the halogenated versions, in particular chlorinated or brominated versions, of this type of copolymer.

Although it applies to any type of diene elastomer, those skilled in the art of tyres will understand that the present invention is preferably employed with essentially unsaturated diene elastomers, in particular of the type (a) or (b) above.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methyl styrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. Mention may be made, for example, for coupling to carbon black, of functional groups comprising a C—Sn bond or aminated functional groups, such as aminobenzophenone, for example; mention may be made, for example, for coupling to a reinforcing inorganic filler, such as silica, of silanol or polysiloxane functional groups having a silanol end (such as described, for example, in FR 2 740 778 or U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973, WO 2009/000750 and WO 2009/000752). Mention may also be made, as other examples of functionalized elastomers, of elastomers (such as SBR, BR, NR or IR) of the epoxidized type.

To summarize, the diene elastomer of the composition can be selected, for example, from the group of highly unsaturated diene elastomers consisting of natural rubber (NR), synthetic polyisoprenes (IRs), polybutadienes (abbreviated to "BRs"), butadiene copolymers, isoprene copolymers and the mixtures of these elastomers. Such copolymers are more preferentially selected from the group consisting of butadiene/styrene copolymers (SBRs), isoprene/butadiene copolymers (BIRs), isoprene/styrene copolymers (SIRs), isoprene/butadiene/styrene copolymers (SBIRs), butadiene/acrylonitrile copolymers (NBRs), butadiene/styrene/acrylonitrile copolymers (NSBRs) or a mixture of two or more of these compounds.

Advantageously, the diene elastomer of the composition is not epoxidized.

According to the invention, the diene elastomer comprises mainly at least one isoprene elastomer. The term "isoprene elastomer" (or "polyisoprene", the two expressions being used in an equivalent manner in the present application) is intended to mean, in a known manner, an isoprene homopolymer or copolymer, in other words a diene elastomer selected from the group consisting of natural rubber (NR), which may be plasticized or peptized, synthetic polyisoprenes (IRs), various isoprene copolymers and mixtures of these elastomers. Mention will in particular be made, among isoprene copolymers, of isobutene/isoprene (butyl rubber IIR), isoprene/styrene (SIR), isoprene/butadiene (BIR) or isoprene/butadiene/styrene (SBIR) copolymers. Preferably, the isoprene elastomer is selected from the group consisting of natural rubber, a synthetic polyisoprene and a mixture thereof, more preferably the isoprene elastomer is natural rubber.

The at least one isoprene elastomer is preferably selected from the group consisting of natural rubber, synthetic polyisoprenes and mixtures thereof. Preferably, the isoprene elastomer comprises a weight content of cis-1,4-bonds of at least 90%, more preferentially of at least 98%, relative to the weight of the isoprene elastomer.

Preferentially, the content of isoprene elastomer, preferably of natural rubber, is from 50 to 100 phr, more preferentially from 60 to 100 phr, more preferentially from 70 to 100 phr, even more preferentially from 80 to 100 phr and very preferentially from 90 to 100 phr. In particular, the content of isoprene elastomer, preferably again of natural rubber, is very preferentially 100 phr.

Whether they contain just one isoprene elastomer or a mixture of at least one isoprene elastomer and of one or more diene elastomers, the compositions of the invention can be used in combination with any type of synthetic elastomer other than a diene elastomer, indeed even with polymers other than elastomers, for example thermoplastic polymers, it being understood that the elastomeric matrix (including the diene and synthetic elastomers and the above-mentioned polymers) comprises mainly isoprene elastomer. Preferably, the composition according to the invention does not contain thermoplastic elastomer or contains less than 10 phr, preferably less than 5 phr, thereof.

Reinforcing Filler

The composition according to the invention comprises a reinforcing filler comprising or consisting of:
from 15 to 70 phr of carbon black having a BET specific surface area of less than 70 $m^2/g$ and/or a COAN of less than 90 ml/100 g, and
from 5 to 20 phr of silica.

The BET specific surface area of the carbon blacks is measured according to Standard D6556-10 [multipoint (a minimum of 5 points) method—gas: nitrogen—relative pressure p/p0 range: 0.1 to 0.3].

In the present application, the term "coarse carbon black" is intended to mean a carbon black having a BET specific surface area of less than 70 $m^2/g$.

The carbon blacks that can be used in the context of the present invention may be any carbon black conventionally used in tyres or their treads ("tyre grade" carbon blacks) of the 400, 500, 600 or 700 series (ASTM grades), for instance the carbon blacks N550, N683 and N772. These carbon blacks can be used in the isolated state, as commercially available, or in any other form, for example as support for some of the rubber additives used. The carbon blacks might, for example, be already incorporated into the diene elastomer, in particular isoprene elastomer, in the form of a masterbatch, produced by dry or liquid process (see, for example, applications WO 97/36724 and WO 99/16600).

Preferably, the coarse carbon black has a BET specific surface area of less than 50 $m^2/g$, preferably a BET specific surface area within a range extending from 32 to 49 $m^2/g$.

Preferably again, the coarse carbon black has a COAN oil absorption number of less than 90 ml/100 g, preferably less than 87 ml/100 g, preferably less than 70 ml/100 g. Advantageously, the coarse carbon black has a COAN within a range extending from 50 to 85 ml/100 g, preferably from 55 to 85 ml/100 g or preferably from 50 to 69 ml/100 g.

The COAN, or Compressed Oil Absorption Number, of the carbon blacks is measured according to ASTM standard D3493-16.

The content of coarse carbon black is within a range extending from 15 to 70 phr. Below 15 phr, it has been observed that the rigidity of the composition begins to no longer be sufficient, whereas above 70 phr, the cohesion properties begin to degrade. Advantageously, the content of coarse carbon black is within a range extending from 20 to 70 phr, preferably from 30 to 65 phr and preferably still from 40 to 60 phr.

The silica that can be used in the context of the present invention may be any silica known to those skilled in the art, especially any precipitated or fumed silica exhibiting a BET surface area and a CTAB specific surface area which are both less than 450 $m^2/g$, preferably from 30 to 400 $m^2/g$.

The BET specific surface area of the silica is determined in a known way by gas adsorption using the Brunauer-Emmett-Teller method described in The Journal of the American Chemical Society, Vol. 60, page 309, February 1938, more specifically according to French standard NF ISO 9277 of December 1996 (multipoint (5 point) volumetric method—gas: nitrogen—degassing: 1 hour at 160° C.—relative pressure p/po range: 0.05 to 0.17).

The CTAB specific surface area of the silica is determined according to French Standard NF T 45-007 of November 1987 (method B).

Preferably, the silica has a BET specific surface area of less than 200 $m^2/g$ and/or a CTAB specific surface area of less than 220 $m^2/g$, preferably a BET specific surface area within a range extending from 125 to 200 $m^2/g$ and/or a CTAB specific surface area within a range extending from 140 to 170 $m^2/g$.

As silicas that can be used in the context of the present invention, mention will for example be made of the highly dispersible precipitated silicas (termed "HDSs") Ultrasil 7000 and Ultrasil 7005 from Evonik, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area as described in application WO 03/16837.

The content of silica is within a range extending from 5 to 20 phr. Below 5 phr, it has been observed that the endurance/cohesion balance is no longer satisfactory, whereas above 20 phr, the grip performance and the processability are penalized. Advantageously, the content of silica is within a range extending from 5 to 15 phr, preferably from 10 to 15 phr.

In the composition according to the invention, the total content of carbon black and silica is advantageously between 30 and 80 phr. Below 30 phr, it has been observed that the rigidity of the composition begins to no longer be sufficient, having a negative impact on the endurance and the road behaviour of the tyre, whereas above 80 phr, the rolling resistance is penalized. Advantageously, the total content of carbon black and silica is between 40 and 70 phr, preferably between 50 and 70 phr or preferably between 40 and 60 phr.

In the composition according to the invention, the weight ratio of carbon black to silica is greater than 1, for example greater than 1.1, for example greater than 1.2. Below 1, it has been observed that the grip performance is degraded. Advantageously, the weight ratio of carbon black to silica is within a range extending from 2 to 10, preferably from 4 to 7.

Those skilled in the art will understand that, as filler equivalent to silica described in the present application, use might be made of a reinforcing filler of another nature, especially organic nature, provided that this reinforcing filler is covered with a layer of silica or else comprises functional sites, in particular hydroxyl sites, at its surface which require the use of a coupling agent in order to form the bond between the filler and the elastomer.

In order to couple the reinforcing silica to the diene elastomer, use is made, in a well-known way, of an at least bifunctional coupling agent (or bonding agent) intended to provide a satisfactory connection, of chemical and/or physical nature, between the silica (surface of its particles) and the diene elastomer. Use is made in particular of organosilanes or polyorganosiloxanes which are at least bifunctional.

Those skilled in the art can find coupling agent examples in the following documents: WO 02/083782, WO 02/30939, WO 02/31041, WO 2007/061550, WO 2006/125532, WO 2006/125533, WO 2006/125534, U.S. Pat. No. 6,849,754, WO 99/09036, WO 2006/023815, WO 2007/098080, WO 2010/072685 and WO 2008/055986.

Mention may in particular be made of alkoxysilane-polysulfide compounds, in particular bis(trialkoxysilylpropyl)polysulfides, most particularly bis(3-triethoxysilylpropyl)disulfide (abbreviated to "TESPD") and bis(3-triethoxysilylpropyl)tetrasulfide (abbreviated to "TESPT"). It is recalled that TESPD, of formula $[(C_2H_5O)_3Si(CH_2)_3S]_2$, is in particular sold by Degussa under the name Si266 or Si75 (in the second case, in the form of a mixture of disulfide (at 75% by weight) and of polysulfides). TESPT, of formula $[(C_2H_5O)_3Si(CH_2)_3S]_2$, is sold in particular by Degussa under the name Si69 (or X50S when it is supported at 50% by weight on carbon black), in the form of a commercial mixture of polysulfides $S_x$ with an average value for x which is close to 4.

The composition according to the invention may comprise a coupling agent or may be free of said coupling agent. Advantageously, the composition according to the invention does not comprise coupling agent or comprises less than 11% thereof, preferably less than 5% thereof, preferably less than 4% thereof, by weight relative to the weight of silica. When the composition comprises a coupling agent, the content of coupling agent can be within a range extending from 0.1 to 0.5 phr, preferably from 0.1 to 0.3 phr.

Crosslinking System

The crosslinking system can be based either on molecular sulfur and/or on sulfur donors and/or on peroxide and/or on bismaleimides, well known to those skilled in the art. The crosslinking system is preferentially a vulcanization system, i.e. a system based on sulfur (and/or on a sulfur-donating agent) and on a primary vulcanization accelerator. Various known secondary vulcanization accelerators or vulcanization activators, such as zinc oxide, stearic acid or equivalent compounds, or guanidine derivatives (in particular diphenylguanidine), are added to this base vulcanization system, being incorporated during the non-productive first phase and/or during the productive phase, as described subsequently.

Advantageously, the sulfur content in the composition according to the invention is greater than 2.5 phr. Preferably, the sulfur content in the composition is within a range extending from 3 to 10 phr, preferably from 3 to 7 phr, more preferably from 4 to 6 phr.

Use may be made, as (primary or secondary) accelerator, of any compound capable of acting as accelerator for the vulcanization of diene elastomers in the presence of sulfur, in particular accelerators of the thiazole type and also their derivatives, and accelerators of thiuram and zinc dithiocarbamate types. These accelerators are, for example, selected from the group consisting of 2-mercaptobenzothiazyl disulfide (abbreviated to MBTS), tetrabenzylthiuram disulfide (TBZTD), N-cyclohexyl-2-benzothiazylsulfenamide (CBS), N,N-dicyclohexyl-2-benzothiazylsulfenamide (DCBS), N-(tert-butyl)-2-benzothiazylsulfenamide (TBBS), N-(tert-butyl)-2-benzothiazylsulfenimide (TBSI), zinc dibenzyldithiocarbamate (ZBEC) and the mixtures of these compounds.

Alkaline-Earth, Alkali or Lanthanide Metal Salt

The composition according to the invention comprises an alkaline-earth, alkali or lanthanide metal salt.

The salt of an alkaline-earth, alkali or lanthanide metal may advantageously be an acetylacetonate of an alkaline-earth, alkali or lanthanide metal.

Preferably, the alkaline-earth, alkali or lanthanide metal of the salt is selected from the group consisting of lithium, sodium, potassium, calcium, magnesium, lanthanum, cerium, praseodymium, neodymium, samarium, erbium and mixtures thereof. Again preferably, the salt of an alkaline-earth, alkali or lanthanide metal is a magnesium or neodymium salt, preferably a magnesium salt. In other words, the salt of an alkaline-earth, alkali or lanthanide metal is advantageously a magnesium or neodymium acetylacetonate, preferably a magnesium acetylacetonate.

The content of the alkaline-earth, alkali or lanthanide metal salt can be for example within a range extending from 0.1 to 5 phr, preferably from 0.5 to 4 phr and more preferentially from 0.5 to 2 phr.

Various Additives

The rubber compositions in accordance with the invention can also comprise all or a portion of the usual additives customarily used in elastomer compositions, such as, for example, pigments, protective agents, such as antiozone waxes, chemical antiozonants or antioxidants, plasticizing agents, antifatigue agents, reinforcing resins, secondary vulcanization accelerators, vulcanization activators, etc.

The composition according to the invention may also comprise stearic acid or a salt thereof. By way of example of stearic acid salt, mention may be made of zinc stearate or cadmium stearate. The content of stearic acid or of a salt thereof may advantageously be within a range extending from 0.5 to 2 phr and preferably from 0.5 to 1 phr.

The composition according to the invention may also comprise a cobalt salt. For example, the cobalt salt may be selected from the group consisting of abietates, acetylacetonates, tallates, naphthenates, resinates and the mixtures thereof. The content of cobalt salt may advantageously be within a range extending from 0.5 to 2 phr and preferably from 0.5 to 1 phr.

The composition according to the invention may also comprise an antioxidant selected from the group consisting of substituted p-phenylenediamines, substituted diphenylamines, substituted triphenylamines, quinoline derivatives, and mixtures thereof. Preferably, the antioxidant is selected from the group consisting of substituted p-phenylenediamines and mixtures thereof. The content of antioxidant may advantageously be within a range extending from 1 to 5 phr and preferably from 2 to 3 phr.

The composition according to the invention may also comprise a metal oxide. The metal oxide may be selected from the group consisting of oxides of group II, IV, V, VI, VII and VIII metals, and mixtures thereof. Preferably, the metal oxide is selected from the group consisting of a zinc oxide, magnesium oxide, cobalt oxide, nickel oxide and mixtures thereof. Again preferably, the metal oxide is a zinc oxide. The content of metal oxide may advantageously be within a range extending from 2 to 20 phr and preferably from 6 to 10 phr. Advantageously, the ratio of metal oxide to stearic acid or a salt thereof is greater than 3, preferably the ratio of metal oxide to stearic acid or a salt thereof is within a range extending from 3 to 20, preferably from 5 to 15, preferably from 5 to 10.

Moreover, the composition may comprise a vulcanization retarder or be free thereof. For example, the composition according to the invention may contain less than 1 phr, preferably less than 0.6 phr, preferably less than 0.3 phr and preferably less than 0.1 phr of vulcanization retarder. As vulcanization retarder, mention may be made of N-cyclohexylthiophthalimide (CTP), sold for example under the name Vulkalent G by Lanxess.

Advantageously, the composition according to the invention does not comprise resorcinol and/or resorcinol derivative and/or hexamethylenetriamine and/or melamine derivative, or comprises less than 0.5 phr, preferably less than 0.4 phr, thereof. Again preferably, the composition according to the invention does not at all comprise reinforcing resin, or comprises less than 0.5 phr, preferably less than 0.4 phr, thereof.

Finished or Semi-Finished Rubber Articles and Tyres

A subject of the present invention is also a finished or semi-finished rubber article, and also a tyre, comprising a composition according to the invention. The invention relates to the articles and tyres both in the raw state (that is to say, before curing) and in the cured state (that is to say, after crosslinking or vulcanization).

The present invention relates in particular to tyres intended to equip motor vehicles of passenger vehicle type, SUVs ("Sport Utility Vehicles"), or two-wheel vehicles (in particular motorcycles), or aircraft, or also industrial vehicles selected from vans, heavy-duty vehicles—that is to say, underground trains, buses, heavy road transport vehicles (lorries, tractors, trailers) or off-road vehicles, such as heavy agricultural vehicles or earthmoving equipment—, and others.

It is possible to define, within the tyre, three types of regions:
- The radially exterior region in contact with the ambient air, this region being essentially composed of the tread and of the external sidewall of the tyre. An external sidewall is an elastomeric layer positioned outside the carcass reinforcement with respect to the internal cavity of the tyre, between the crown and the bead, so as to completely or partially cover the region of the carcass reinforcement extending from the crown to the bead.
- The radially interior region in contact with the inflation gas, this region generally being composed of the layer airtight to the inflation gases, sometimes known as interior airtight layer or inner liner.
- The internal region of the tyre, that is to say that between the exterior and interior regions. This region includes layers or plies which are referred to here as internal layers of the tyre. These are, for example, carcass plies, tread underlayers, tyre belt plies or any other layer which is not in contact with the ambient air or the inflation gas of the tyre.

The composition defined in the present description is particularly well suited to the internal layers of tyres.

Consequently, in the tyre according to the present invention, the composition according to the invention can be present in at least one internal layer. According to the invention, the internal layer can be selected from the group consisting of carcass plies, crown plies, bead-wire fillings, crown feet, decoupling layers, edge rubbers, the tread underlayer and the combinations of these internal layers. Preferably, the internal layer is selected from the group consisting of carcass plies, crown plies, crown feet, decoupling layers, edge rubbers and the combinations of these internal layers. In the present application, the term "edge rubber" is intended to mean a layer placed in the tyre directly in contact with the end of a reinforcing ply, with the end of a reinforcing element or with another edge rubber.

According to the invention, the article according to the invention or the internal layer of the tyre according to the invention may comprise textile or metal reinforcers. These may be any textile or metal reinforcer known to those skilled in the art. Advantageously, the article according to the invention or the internal layer of the tyre according to the invention comprises metal monofilaments, preferably made of steel. Preferably, the diameter of the metal monofilaments is between 0.20 and 0.50 mm. Preferably, the density of the metal monofilaments is between 120 and 180 threads/dm.

Moreover, the composition according to the invention is particularly suitable for the rubber layers (10a), (10b) and (10c) described in applications WO 2013/117476 and WO 2013/117477. Thus, the tyre according to the present invention may also comprise a belt as defined in application WO 2013/117476 or WO 2013/117477. The tyre according to the invention may for example be a tyre as defined in application WO 2013/117476 or WO 2013/117477, in which one or more of the compositions (C1), (C2) or (C3) comprise or consist of a composition according to the present invention.

For example, the tyre according to the invention may be a radial tyre (1), defining three main directions, circumferential (X), axial (Y) and radial (Z), comprising a crown (2) surmounted by a tread (3), two sidewalls (4), two beads (5), each sidewall (4) connecting each bead (5) to the crown (2), a carcass reinforcement (7) that is anchored in each of the beads (5) and extends in the sidewalls (4) and in the crown (2), a crown reinforcement or belt (10) that extends in the crown (2) in the circumferential direction (X) and is situated radially between the carcass reinforcement (7) and the tread (3), said belt (10) comprising a multilayer composite laminate (10a, 10b, 10c) comprising at least three superposed layers of reinforcers (110, 120, 130), said reinforcers being unidirectional within each layer and embedded in a thickness of rubber (C1, C2, C3, respectively), with:
- on the tread side, a first layer (10a) of rubber (C1) comprising a first row of reinforcers (110) which are oriented at an angle alpha of −5 to +5 degrees with respect to the circumferential direction (X), these reinforcers (110) referred to as first reinforcers being made of a heat-shrinkable textile material;
- in contact with the first layer (10a) and arranged underneath the latter, a second layer (10b) of rubber (C2) comprising a second row of reinforcers (120) which, oriented at a given angle beta, positive or negative, are between 10 and 30 degrees with respect to the circumferential direction (X), these reinforcers (120) referred to as second reinforcers being metal reinforcers;
- in contact with the second layer (10b) and arranged underneath the latter, a third layer (10c) of rubber (C3) comprising a third row of reinforcers (130) which are oriented at an angle gamma the opposite of the angle beta, itself between 10 and 30 degrees with respect to the circumferential direction (X), these reinforcers (130) referred to as third reinforcers being metal reinforcers;

characterized in that, on the one hand:
- the second (120) and third (130) reinforcers consist of steel monofilaments of which the diameter, denoted D2 and D3 respectively, is between 0.20 mm and 0.50 mm;
and the following features, measured in the central part of the belt of the tyre in the vulcanized state, on each side of the median plane (M) over a total axial width of 4 cm, are satisfied:
- the mean envelope diameter D1 of the first reinforcers (110) is between 0.40 mm and 0.70 mm;
- the density $d_1$ of the first reinforcers (110) in the first layer of rubber (C1), measured in the axial direction (Y), is between 70 and 130 threads/dm (decimetre, namely per 100 mm of rubber layer);
- the density, $d_2$ and $d_3$ respectively, of the second (120) and third (130) reinforcers in the second (C2) and third (C3) layers of rubber respectively, measured in the axial direction (Y), is between 120 and 180 threads/dm;
- the mean thickness $Ez_1$ of rubber separating a first reinforcer (110) from the second reinforcer (120) closest to it, measured in the radial direction (Z), is between 0.25 and 0.40 mm;
- the mean thickness $Ez_2$ of rubber separating a second reinforcer (120) from the third reinforcer (130) closest to it, measured in the radial direction (Z), is between 0.35 and 0.60 mm;

and in that, on the other hand, the following inequalities are satisfied:

$$CT<7.5\% \quad (1)$$

$$0.20<Ez_1/(Ez_1+D1+D2)<0.30 \quad (2)$$

$$0.30<Ez_2/(Ez_2+D2+D3)<0.50 \quad (3)$$

CT being the thermal contraction of the first reinforcers (110) made of heat-shrinkable textile material, after 2 min at 185° C.;

in which tyre one or more of the compositions (C1), (C2) or (C3) comprise or consist of a composition according to the present invention.

FIG. 1 very schematically shows (that is to say without being drawn to any particular scale) a radial section through a tyre according to the invention, for example for a vehicle of the passenger vehicle or van type, the belt of which comprises a multilayer composite laminate according to the invention. This tyre (1), defining three perpendicular directions, circumferential (X), axial (Y) and radial (Z), comprises a crown (2) surmounted by a tread (3), two sidewalls (4), two beads (5), each sidewall (4) connecting each bead (5) to the crown (2), a carcass reinforcement (7) anchored in each of the beads (5) and extending in the sidewalls (4) and in the crown (2), a crown reinforcement or belt (10) extending in the crown (2) in the circumferential direction (X) and situated radially between the carcass reinforcement (7) and the tread (3). The carcass reinforcement (7) is, in the known way, made up of at least one rubber ply reinforced with textile cords referred to as "radial", which are disposed practically parallel to one another and extend from one bead to the other so as to make an angle generally between 80° and 90° with the median circumferential plane M; in this case, by way of example, it is wrapped around two bead wires (6) in each bead (5), the turn-up (8) of this reinforcement (7) being, for example, disposed towards the outside of the tyre (1) which is shown in this case as mounted on its rim (9).

According to the invention, the angles β and γ, of opposite direction, which are both between 10° and 30°, may be identical or different, that is to say that the second (120) and third (130) reinforcers may be disposed symmetrically or non-symmetrically on each side of the median circumferential plane (M) defined above.

In this tyre shown schematically in FIG. 1, it will of course be understood that the tread 3, the multilayer laminate 10 and the carcass reinforcement 7 may or may not be in contact with one another, even though these parts have been deliberately separated in FIG. 1, schematically, for the sake of simplicity and to make the drawing clear. They could be physically separated, at the very least for a portion of them, for example by tie gums, well known to those skilled in the art, that are intended to optimize the cohesion of the assembly after curing or crosslinking.

In the tyre of the invention, the second (120) and third (130) reinforcers consist, by definition, of steel monofilaments of which the diameter, denoted D2 and D3 respectively, is between 0.20 mm and 0.50 mm, preferably greater than 0.25 mm and less than 0.40 mm. More preferentially, for optimum endurance of the tyre of the invention, notably under harsh running conditions, it is preferable for D2 and D3 to be comprised in a range from 0.28 to 0.35 mm.

A steel "monofilament" or "monothread" here means any individual steel filament, whatever the shape of its cross section, the diameter or thickness D of which is greater than 100 μm, D representing the shortest dimension of its cross section, when the latter is non-circular. This definition therefore covers both monofilaments of essentially cylindrical shape (with a circular cross section) and monofilaments of different shape, for example oblong monofilaments (with flattened shape); in the second instance (non-circular section), the ratio of the longest dimension to the shortest dimension of the cross section is preferably less than 50, more preferentially less than 30, and in particular less than 20.

Figure 2:
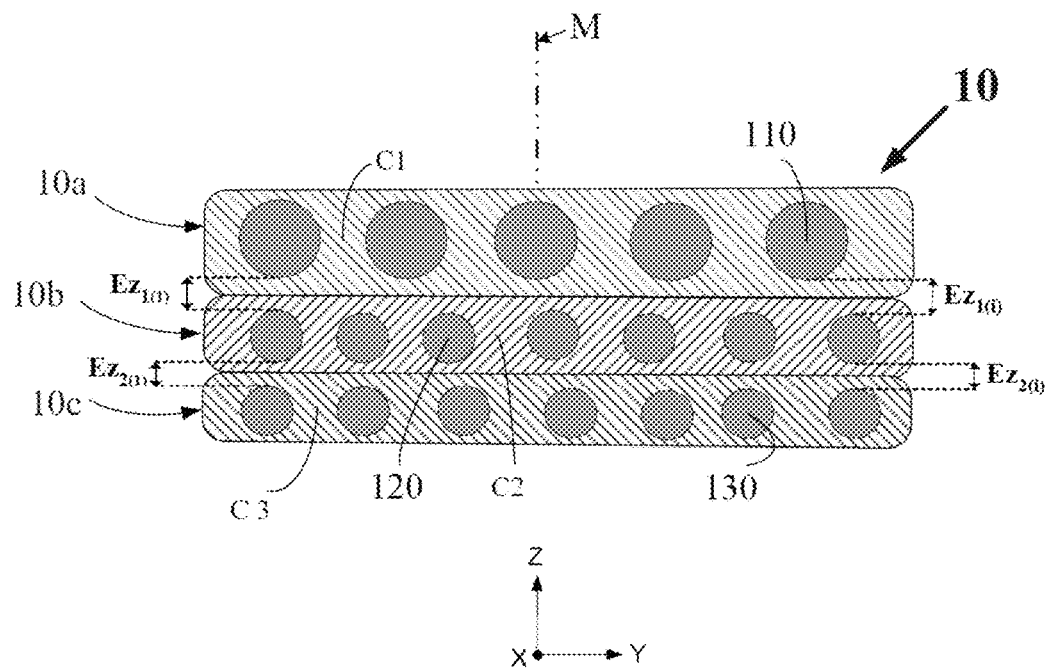
FIG. 2 schematically depicts, in cross section, the multi-layer composite laminate (10a, 10b, 10c) used as a belt (10) in the tire (1) of FIG. 1.

FIG. 2 schematically (and without being drawn to any particular scale) depicts, in cross section, the multilayer composite laminate (10a, 10b, 10c) used as a belt (10) in the tyre (1) according to the invention of FIG. 1.

As illustrated in FIG. 2, $Ez_1$ is the mean of the thicknesses ($Ez_{1(1)}$, $Ez_{1(2)}$, $Ez_{1(3)}$, . . . , $Ez_{1(i)}$) of rubber separating a first reinforcer (110) from the second reinforcer (120) closest to it, these thicknesses each being measured in the radial direction Z and averaged over a total axial distance between −2.0 cm and +2.0 cm with respect to the centre of the belt (namely, for example, to a total of around 40 measurements if there are ten reinforcers (110) per cm in the layer C1).

Expressed differently, $Ez_1$ is the mean of the minimum distances $Ez_{1(i)}$ separating each first reinforcer (110) "back-to-back" from the second reinforcer (120) closest to it in the radial direction Z, this mean being calculated over all the first reinforcers (110) present in the central part of the belt, in an axial interval extending between −2 cm and +2 cm with respect to the median plane M.

Similarly, $Ez_2$ is the mean of the thicknesses of rubber ($Ez_{2(1)}$, $Ez_{2(2)}$, $Ez_{2(3)}$, . . . , $Ez_{2(i)}$) separating a second reinforcer (120) from the third reinforcer (130) closest to it, measured in the radial direction Z, this mean being calculated over a total axial distance between −2.0 cm and +2.0 cm with respect to the centre of the belt. Expressed another way, these thicknesses represent the minimum distances which separate the second reinforcer (120) "back-to-back" from the third reinforcer (130) closest to it in the radial direction Z.

Expressed another way, $Ez_2$ is the mean of the minimum distances $Ez_{2(i)}$ separating each second reinforcer (120) "back-to-back" from the third reinforcer (130) closest to it in the radial direction Z, this mean being calculated over all the second reinforcers (120) present in the central part of the belt, in an axial interval extending between −2 cm and +2 cm with respect to the median plane M.

The parameter CT is measured, unless specified otherwise, in accordance with ASTM standard D1204-08, for example on an apparatus of the "TESTRITE" type under what is known as a standard pretension of 0.5 cN/tex (which is therefore expressed with respect to the linear density or titre of the sample tested). At constant length, the maximum force of contraction (denoted $F_C$) is also measured using the above test, this time at a temperature of 180° C. and under 3% elongation. This force of contraction $F_C$ is preferentially greater than 20 N (Newtons). A high force of contraction has proven to be particularly beneficial to the hooping capability of the first reinforcers (110) made of heat-shrinkable textile material with respect to the crown reinforcement of the tyre when the latter heats up under a high running speed.

The above parameters CT and Fc can be measured indistinctly on the adhesive coated initial textile reinforcers before they are incorporated into the laminate and the tyre or alternatively can be measured on these reinforcers once they have been extracted from the central zone of the vulcanized tyre and preferably "derubberized" (namely rid of the rubber which coats them in the layer C1).

Any heat-shrinkable textile material that satisfies the contraction features CT mentioned hereinabove is suitable. For preference, this heat-shrinkable textile material is selected from the group consisting of polyamides, polyesters and polyketones. Among the polyamides, mention may be made notably of the polyamides 4,6, 6, 6,6, 11 or 12. Mention may be made, among the polyesters, for example, of PET (polyethylene terephthalate), PEN (polyethylene naphthalate), PBT (polybutylene terephthalate), PBN (polybutylene naphthalate), PPT (polypropylene terephthalate) and PPN (polypropylene naphthalate). Hybrid reinforcers made up of two (at least two) different materials such as aramid/nylon, aramid/polyester, aramid/polyketone hybrid cords, for example, can also be used provided that they satisfy the recommended CT feature.

According to one particularly preferential embodiment, the heat-shrinkable textile material is a polyester, notably PET or PEN, very particularly a PET. More preferentially still, the polyester used is an HMLS (High Modulus Low Shrinkage) PET.

The first reinforcers made of heat-shrinkable material may have any known form, admittedly they may be monofilaments but they are more usually made up of multifilament fibres twisted together in the form of textile ropes. The envelope diameter means, in the usual way, the diameter of the imaginary cylinder of revolution that surrounds such first reinforcers in the general case of these reinforcers not being of circular cross section (contrary to the simple case of individual filaments).

The first reinforcers (110) made of heat-shrinkable textile material may adopt any known shape, they may for example be elementary monofilaments of large diameter (for example equal to or greater than 50 µm), multifilament fibres (consisting of a plurality of elementary filaments of small diameter, typically less than 30 µm), textile folded yarns formed of several fibres twisted together, textile cords formed of several fibres or monofilaments cabled or twisted together.

By definition, the second (120) and third (130) reinforcers are, by definition, steel monofilaments. Preferably, the steel is a carbon steel such as the steels used in cords of the "steel cords" type for tyres; however it is of course possible to use other steels, for example stainless steels, or other alloys.

According to one preferential embodiment, when a carbon steel is used, its carbon content (% by weight of steel) is comprised in a range from 0.8% to 1.2%; according to another preferential embodiment, the carbon content of the steel is comprised in a range from 0.6% to 0.8%. The invention applies in particular to steels of the "Normal Tensile" (NT) or "High Tensile" (HT) steel cord type, the (second and third) reinforcers made of carbon steel then having a tensile strength (Rm) preferably higher than 2000 MPa, more preferentially higher than 2500 MPa. The invention also applies to super high tensile (SHT), ultra high tensile (UHT) or megatensile (MT) steels of the steel cord type, the (second and third) reinforcers made of carbon steel then having a tensile strength (Rm) preferably higher than 3000 MPa, more preferentially higher than 3500 MPa. The total elongation at break (At) of these reinforcers, which is the sum of the elastic elongation and the plastic elongation, is preferably greater than 2.0%.

As far as the (second and third) reinforcers made of steel are concerned, the measurements of force at break, strength at break denoted Rm (in MPa) and elongation at break denoted At (total elongation in %) are taken under tension in accordance with ISO standard 6892 of 1984.

The steel used, whether it is in particular a carbon steel or a stainless steel, may itself be coated with a layer of metal which improves for example the workability of the steel monofilament or the wear properties of the reinforcer and/or of the tyre themselves, such as properties of adhesion, corrosion resistance or even resistance to ageing. According to one preferential embodiment, the steel used is covered with a layer of brass (Zn—Cu alloy) or of zinc; it will be recalled that, during the process of manufacturing the threads, the brass or zinc coating makes the thread easier to draw, and makes the thread adhere to the rubber better. However, the reinforcers could be covered with a thin layer of metal other than brass or zinc, having for example the function of improving the corrosion resistance of these threads and/or their adhesion to the rubber, for example a thin layer of Co, Ni, Al, of an alloy of two or more of the Cu, Zn, Al, Ni, Co, Sn compounds.

Preparation of the Rubber Compositions

The compositions used in the context of the present invention can be manufactured in appropriate mixers, using two successive phases of preparation well known to those skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) down to a lower temperature, typically of less than 110° C., for example between 40° C. and 100° C., during which finishing phase the crosslinking system is incorporated.

The process for preparing such compositions comprises, for example, the following steps:
  a) incorporating a reinforcing filler in a diene elastomer during a first step (termed "non-productive" step), everything being kneaded thermomechanically (for example, in one or more goes), until a maximum temperature of between 110° C. and 190° C. is reached;
  b) cooling the combined mixture to a temperature of less than 100° C.;
  c) subsequently incorporating, during a ("productive") second step, a crosslinking system;
  d) kneading everything to a maximum temperature of less than 110° C.

By way of example, the non-productive phase is carried out in a single thermomechanical step during which, in a first step, all the base constituents necessary (a diene elastomer, reinforcing filler) are introduced into an appropriate mixer, such as a standard internal mixer, followed, in a second step, for example after kneading for one to two minutes, by the other additives, optional additional agents for covering the filler or optional additional processing aids, with the exception of the crosslinking system. The total duration of the kneading, in this non-productive phase, is preferably between 1 and 15 min.

The first kneading step is generally carried out by incorporating the reinforcing filler in the elastomer in one or more doses while thermomechanically kneading. In the case where the reinforcing filler, in particular the carbon black, is already incorporated in full or in part in the elastomer in the form of a masterbatch, as is described, for example, in applications WO 97/36724 and WO 99/16600, it is the masterbatch which is kneaded directly and, if appropriate, the other elastomers or reinforcing fillers present in the composition which are not in the masterbatch form, and also the additives other than the crosslinking system, are incorporated.

After cooling the mixture thus obtained, the crosslinking system is then incorporated in an external mixer, such as an open mill, maintained at a low temperature (for example between 40° C. and 100° C.). The combined mixture is then mixed (productive phase) for a few minutes, for example between 2 and 15 min.

The final composition thus obtained can subsequently be calendered, for example in the form of a sheet or of a plaque, in particular for a laboratory characterization, or else extruded, for example in order to form a rubber profiled element used in the manufacture of a tyre.

Examples

I. Measurements and Tests Used
I.1 Dynamic Properties

The dynamic property tan(δ)max was measured on a viscosity analyser (Metravib VA4000) according to ASTM standard D 5992-96. The response of a sample of vulcanized composition (cylindrical test specimen with a thickness of 4 mm and a cross section of 400 mm$^2$), subjected to a simple alternating sinusoidal shear stress, at a frequency of 10 Hz and at a temperature of 40° C., according to ASTM standard D 1349-99, is recorded. A strain amplitude sweep was carried out from 0.1% to 50% (outward cycle) and then from 50% to 0.1% (return cycle). The result made use of is the loss factor (tan δ). The maximum value of tan δ observed (tan(δ)max), between the values at 0.1% and at 50% strain (Payne effect), was shown for the return cycle. It is recalled that, in a well-known manner, the lower the value for tan(δ)max at 40° C., the lower will be the hysteresis of the composition and thus the more its rolling resistance will be improved.

I.2 Adhesion Test

A tearing-out test in accordance with ASTM standard D2229 was carried out on test specimens comprising metal cords of 2.30NF structure, a portion of which is inserted between two strips made of a rubber composition and another portion of which is left free. The force necessary to tear the cord out of the two rubber strips was measured. The measurement was carried out for 15 cords. The value retained was the mean of the measurements on these 15 cords. The greater the value of the force, the greater the adhesion between the cord and the rubber composition. The adhesion test described above was carried out with test specimens cured for a period of time of less than 1 hour at a temperature of greater than 100° C. and aged for several days at a temperature of greater than 30° C. and at more than 50% relative humidity.

II. Preparation of the Compositions

The tests which follow are carried out in the following way: the diene elastomer, the thermoplastic styrene elastomer, the reinforcing filler and also the various other ingredients, with the exception of the vulcanization system, are successively introduced into an internal mixer (final degree of filling: approximately 70% by volume), the initial vessel temperature of which is approximately 60° C. Thermomechanical working is then carried out (non-productive phase) in one step, which lasts in total approximately from 3 to 4 min, until a maximum "dropping" temperature of 165° C. is reached.

The mixture thus obtained is recovered and cooled and then sulfur and an accelerator of sulfenamide type are incorporated on a mixer (homofinisher) at 30° C., everything being mixed (productive phase) for an appropriate time (for example between 5 and 12 min).

The compositions thus obtained are subsequently calendered, either in the form of plaques (thickness of 2 to 3 mm) or of thin sheets of rubber, for the measurement of their physical or mechanical properties, or extruded in the form of a profiled element. In the case where metal reinforcers are present in the composition, the metal reinforcers were calendered between two layers of rubber composition in the raw (unvulcanized) state, each having a thickness of around 1 mm, in a way well known to those skilled in the art.

III. Tests on Rubber Compositions

Five rubber compositions were prepared as indicated above, four in accordance with the invention (hereinafter denoted C1 to C4) and one not in accordance (control composition, hereinafter denoted T1). Their formulations (in phr) and their properties have been summarized in Table 1 below. The BET specific surface area and the COAN of the carbon blacks used in these formulations are specified in Table 2.

The control composition T1 is a composition conventionally used in tyre treads in order to reduce rolling resistance.

The tan(δ)max results are presented in base 100 relative to the control composition T1. The lower the plus value of tan(δ)max at 40° C. base 100, the lower will be the hysteresis of the composition and thus the more its rolling resistance will be improved.

TABLE 1

Formulations tested and associated results

| | T1 | C1 | C2 | C3 | C4 |
|---|---|---|---|---|---|
| NR (1) | 100 | 100 | 100 | 100 | 100 |
| N326 (2) | 55 | — | — | — | — |
| N550 (2) | — | 47 | 57 | 52 | 47 |
| Silica (3) | — | 10 | 10 | 15 | 20 |
| DPG (4) | — | 1 | 1 | 1 | 1 |
| 6PPD (5) | 3 | 3 | 3 | 3 | 3 |
| Stear. Ac. (6) | 0.6 | 0.6 | 0.6 | 0.6 | 0.6 |
| ZnO (7) | 8 | 8 | 8 | 8 | 8 |
| Acac(Mg) (8) | 1.8 | 1.8 | 1.8 | 1.8 | 1.8 |
| Co salt (9) | 1 | 1 | 1 | 1 | 1 |
| Sulfur | 5 | 5 | 5 | 5 | 5 |
| TBBS (10) | 0.8 | 0.8 | 0.8 | 0.8 | 0.8 |
| Tan(δ)max return at 40° C. | 100 | 54 | 73 | 65 | 67 |

(1) Natural Rubber
(2) Carbon black N326, N550 (name according to ASTM standard D-1765)
(3) Zeosil 160MP silica, sold by Rhodia
(4) Perkacit DPG diphenylguanidine from Flexsys
(5) N-(1,3-Dimethylbutyl)-N-phenyl-para-phenylenediamine (Santoflex 6-PPD from Flexsys)
(6) Stearin (Pristerene 4931 from Uniqema)
(7) Zinc oxide (industrial grade - Umicore)
(8) Magnesium acetylacetonate "NACEM Magnesium" (CAS 68488-07-3) from the company Niho Kagaku Sangyo
(9) cobalt naphthenate - product No. 60830 from Fluka
(10) N-tert-butyl-2-benzothiazylsulfenamide Santocure TBBS from Flexsys

TABLE 2

Specific surface areas and COAN of the carbon blacks used

| Carbon blacks | BET specific surface area (m$^2$/g) | COAN (ml/100 g) |
|---|---|---|
| N326 | 78 | 68 |
| N550 | 39 | 85 |

The results presented in Table 1 show that the compositions in accordance with the invention all make it possible to improve the rolling resistance. Moreover, it was noted that the compositions in accordance with the present invention exhibit good adhesion properties.

The invention claimed is:

1. A rubber composition based on at least:
   a diene elastomer comprising mainly an isoprene elastomer;
   a reinforcing filler comprising:
   from 15 to 70 phr of carbon black having a BET specific surface area of less than 70 m$^2$/g, and
   from 5 to 20 phr of silica;
   a salt of an alkaline-earth, alkali or lanthanide metal, wherein the salt of the alkaline-earth, alkali or lanthanide metal is an acetylacetonate of an alkaline-earth, alkali or lanthanide metal; and
   a crosslinking system;
   wherein the ratio of carbon black to silica is greater than 1.

2. The rubber composition according to claim 1, wherein the content of isoprene elastomer is within a range extending from 60 to 100 phr.

3. The rubber composition according to claim 1, wherein the isoprene elastomer is selected from the group consisting of natural rubber, a synthetic polyisoprene and a mixture thereof.

4. The rubber composition according to claim 1, wherein the carbon black has a BET specific surface area of less than 50 m$^2$/g.

5. The rubber composition according to claim 1, wherein the carbon black has a COAN oil absorption number of less than 90 ml/100 g.

6. The rubber composition according to claim 1, wherein the silica has a BET specific surface area of less than 200 m$^2$/g, a CTAB specific surface area of less than 220 m$^2$/g, or both a BET specific surface area of less than 200 m$^2$/g and a CTAB specific surface area of less than 220 m$^2$/g.

7. The rubber composition according to claim 1, wherein the carbon black content is within a range extending from 20 to 70 phr.

8. The rubber composition according to claim 1, wherein the silica content is within a range extending from 5 to 15 phr.

9. The rubber composition according to claim 1, wherein the total content of silica and carbon black is within a range extending from 30 to 80 phr.

10. The rubber composition according to claim 1, wherein the carbon black to silica ratio is within a range extending from 2 to 10.

11. The rubber composition according to claim 1 further comprising a coupling agent.

12. The rubber composition according to claim 1, wherein the rubber composition comprises from 0 to less than 11% by weight relative to the weight of silica of coupling agent.

13. The rubber composition according to claim 1, wherein the salt of the alkaline-earth, alkali or lanthanide metal is selected from the group consisting of lithium, sodium, potassium, calcium, magnesium, lanthanum, cerium, praseodymium, neodymium, samarium, erbium and mixtures thereof.

14. The rubber composition according to claim 1, wherein the salt of the alkaline-earth, alkali or lanthanide metal is a magnesium salt or a neodymium salt.

15. The rubber composition according to claim 1, wherein the content of the alkaline-earth, alkali or lanthanide metal salt is within a range extending from 0.1 to 5 phr.

16. The rubber composition according to claim 1 further comprising stearic acid or a salt thereof.

17. The rubber composition according to claim 16, wherein the content of stearic acid or of a salt thereof is within a range extending from 0.5 to 2 phr.

18. The rubber composition according to claim 1 further comprising a cobalt salt.

19. The rubber composition according to claim 18, wherein the cobalt salt is selected from the group consisting of abietates, acetylacetonates, tallates, naphthenates, resinates and mixtures thereof.

20. The rubber composition according to claim 18, wherein the content of cobalt salt is within a range extending from 0.5 to 2 phr.

21. The rubber composition according to claim 1 further comprising an antioxidant selected from the group consisting of substituted p-phenylenediamines, substituted diphenylamines, substituted triphenylamines, quinoline derivatives, and mixtures thereof.

22. The rubber composition according to claim 21, wherein the antioxidant is selected from the group consisting of substituted p-phenylenediamines and mixtures thereof.

23. The rubber composition according to claim 21, wherein the content of antioxidant is within a range extending from 1 to 5 phr.

24. The rubber composition according to claim 1 further comprising a metal oxide selected from the group consisting of oxides of group II, IV, V, VI, VII and VIII metals, and mixtures thereof.

25. The rubber composition according to claim 24, wherein the metal oxide is a zinc oxide.

26. The rubber composition according to claim 24, wherein the content of metal oxide is within a range extending from 2 to 20 phr.

27. The rubber composition according to claim 24 further comprising stearic acid or a salt thereof, wherein the ratio of metal oxide to stearic acid or a salt thereof is greater than 3.

28. The rubber composition according to claim 1, wherein the crosslinking system comprises molecular sulfur, a sulfur donor, or both molecular sulfur and a sulfur donor.

29. The rubber composition according to claim 28, wherein the sulfur content is greater than 2.5 phr.

30. A finished or semi-finished rubber article comprising a rubber composition according to claim 1.

31. A tire comprising a rubber composition according to claim 1.

32. The tire according to claim 31, wherein the rubber composition is present in at least one internal layer.

33. The tire according to claim 32, wherein the internal layer is selected from the group consisting of carcass plies, crown plies, bead-wire fillings, crown feet, decoupling layers, the tread underlayer and combinations thereof.

* * * * *